United States Patent
Lei

(10) Patent No.: US 12,544,123 B2
(45) Date of Patent: Feb. 10, 2026

(54) RADIO FREQUENCY MICRONEEDLE ARRAY CONTROL DEVICE, METHOD AND RADIO FREQUENCY MICRONEEDLE THERAPEUTIC APPARATUS

(71) Applicant: Shenzhen Peninsula Medical Co., Ltd., Shenzhen (CN)

(72) Inventor: Xiaobing Lei, Shenzhen (CN)

(73) Assignee: Shenzhen Peninsula Medical Co., Ltd., Shenzhen (CN)

( * ) Notice: Subject to any disclaimer, the term of this patent is extended or adjusted under 35 U.S.C. 154(b) by 577 days.

(21) Appl. No.: 17/928,736

(22) PCT Filed: May 28, 2021

(86) PCT No.: PCT/CN2021/096874
§ 371 (c)(1),
(2) Date: Nov. 30, 2022

(87) PCT Pub. No.: WO2021/244435
PCT Pub. Date: Dec. 9, 2021

(65) Prior Publication Data
US 2023/0293221 A1  Sep. 21, 2023

(30) Foreign Application Priority Data
May 30, 2020 (CN) .......................... 202010488597.4

(51) Int. Cl.
*A61B 18/12* (2006.01)
*A61B 18/00* (2006.01)

(52) U.S. Cl.
CPC .... *A61B 18/12* (2013.01); *A61B 2018/00702* (2013.01); *A61B 2018/00875* (2013.01)

(58) Field of Classification Search
CPC .......... A61B 18/12; A61B 2018/00702; A61B 2018/00875; A61B 2018/00023;
(Continued)

(56) References Cited

U.S. PATENT DOCUMENTS 10,492,849 B2  12/2019  Juergens et al.

FOREIGN PATENT DOCUMENTS

| CN | 104434302 A | 3/2015 |
| CN | 105055017 A | 11/2015 |

(Continued)

OTHER PUBLICATIONS

International Search Report and Written Opinion issued in corresponding PCT Application No. PCT/CN2021/096874, dated Jul. 26, 2021.

(Continued)

*Primary Examiner* — Mark W. Bockelman
(74) *Attorney, Agent, or Firm* — Westbridge IP LLC

(57) ABSTRACT

Disclosed are a radio frequency microneedle array control device, a method and a radio frequency microneedle therapeutic apparatus. The device includes a microneedle array, a switch switching circuit and a main controller. An input terminal of the switch switching circuit is connected to the power supply, two first output terminals of the switch switching circuit are electrically connected to the microneedle array through the PCB, and a second output terminal of the switch switching circuit is electrically connected to the return electrode. The main controller controls the switch switching circuit to communicate the power supply, the microneedle array and the return electrode in the unipolar mode, and electrical polarities of the microneedle electrodes in the microneedle array are identical; and the main controller controls the switch switching circuit to communicate the power supply and the microneedle array in the bipolar mode.

12 Claims, 5 Drawing Sheets

(58) Field of Classification Search
CPC .. A61B 2018/0016; A61B 2018/00196; A61B 2018/00642; A61B 18/1206; A61B 2018/00452; A61B 2018/00666; A61B 2018/124; A61B 2018/1253; A61B 2018/126; A61B 2018/143; A61B 18/1402; A61B 2018/00714; A61B 2018/00791; A61B 2090/064; A61B 2018/00011; A61M 37/0015
See application file for complete search history.

(56) References Cited

FOREIGN PATENT DOCUMENTS

| | | | |
|---|---|---|---|
| CN | 105833425 | A | 8/2016 |
| CN | 106178251 | A | 12/2016 |
| CN | 106264711 | A | 1/2017 |
| CN | 208481456 | U | 2/2019 |
| CN | 111529056 | A | 8/2020 |
| CN | 112043375 | A | 12/2020 |
| CN | 112190833 | A | 1/2021 |
| CN | 112237474 | A | 1/2021 |
| CN | 112237475 | A | 1/2021 |
| CN | 212490128 | U | 2/2021 |

OTHER PUBLICATIONS

First Office Action issued in counterpart Chinese Patent Application No. 202010488597.4, dated Aug. 28, 2024.

RADIO FREQUENCY MICRONEEDLE ARRAY CONTROL DEVICE, METHOD AND RADIO FREQUENCY MICRONEEDLE THERAPEUTIC APPARATUS

CROSS-REFERENCE TO RELATED APPLICATIONS

This application is the national stage of the International Application PCT/CN2021/096874, filed on May 28, 2021, which claims priority to Chinese Patent Application No. 202010488597.4, filed on May 30, 2020, and entitled "RADIO FREQUENCY MICRONEEDLE ARRAY CONTROL DEVICE, METHOD AND RADIO FREQUENCY MICRONEEDLE THERAPEUTIC APPARATUS", the entire contents of which are incorporated herein by reference.

TECHNICAL FIELD

The present application relates to the technical field of medical devices, and in particular, to a radio frequency microneedle array control device, a radio frequency microneedle array control method and a radio frequency microneedle therapeutic apparatus.

BACKGROUND

Radio frequency microneedle therapy is a micro-invasive radio frequency lattice technology. The radio frequency microneedle therapy uses tiny microneedles to accurately apply radio frequency (referred to as RF) energy to target tissues at different depths, which fundamentally changes the uncertain depth of traditional laser and radio frequency treatment, poor control of skin damage, serious attenuation of energy transmission and other problems. Meanwhile, it avoids the production of side effects such as pigmentation, and can be used for facial rejuvenation applications such as skin tightening and scar removal, as well as used for acne treatment and axillary hyperhidrosis treatment.

However, there are still many problems in the current microneedle lattice radio frequency treatment process. For example, the microneedle electrodes are fixed positive and negative electrodes, that is, the same microneedle electrode always acts as a positive electrode or always acts as the negative electrode during the application process, which will lead to uneven energy during the treatment process, and will easily affect the treatment effect and experience effect.

Technical Solutions

The main purpose of the present application is to provide a radio frequency microneedle array control device, a radio frequency microneedle array control method and a radio frequency microneedle therapeutic apparatus, aiming to switch between the single electrode and double electrode of the microneedle, so that the action area of the microneedle has better treatment effect in a width horizontal to the skin and a depth perpendicular to the skin.

In order to achieve the above purpose, the present application provides a radio frequency microneedle array control device, including:
a power supply;
a return electrode;
a microneedle array, including a printed circuit board (PCB) and a plurality of microneedle electrodes provided on the PCB;
a switch switching circuit, an input terminal of the switch switching circuit is connected to the power supply, two first output terminals of the switch switching circuit are electrically connected to the microneedle array through the PCB, and a second output terminal of the switch switching circuit is electrically connected to the return electrode; and
a main controller having a unipolar mode and a bipolar mode, the main controller is configured to control the switch switching circuit to communicate the power supply, the microneedle array and the return electrode in the unipolar mode, and electrical polarities of the plurality of microneedle electrodes in the microneedle array are identical; and the main controller is configured to control the switch switching circuit to communicate the power supply and the microneedle array in the bipolar mode, and the electrical polarity of at least one of the microneedle electrodes in the microneedle array is opposite to the electrical polarity of the remaining microneedle electrodes in the microneedle array.

In an embodiment, the main controller is configured to control the switch switching circuit to operate to control the microneedle array to switch between the unipolar mode and the bipolar mode.

In an embodiment, the main controller is configured to controls the microneedle array to switch between the unipolar mode and the bipolar mode at least once while controlling the switch switching circuit to operate.

In an embodiment, the main controller is configured to control the switch switching circuit to operate to control the microneedle array to switch between the unipolar mode and the bipolar mode in a preset cycle.

In an embodiment, the main controller is configured to control the switch switching circuit to switch the electrical polarity of each microneedle electrode of the microneedle array in the bipolar mode.

In an embodiment, the main controller switches the electrical polarity of each microneedle electrode of the microneedle array at least once while controlling the switch switching circuit to operate.

In an embodiment, the power supply includes a radio frequency power supply or a plurality of mutually independent radio frequency power supplies connected to the switch switching circuit.

The present application further provides a radio frequency microneedle array control method, applied to the radio frequency microneedle array control device as described above, the radio frequency microneedle array control device includes:
a power supply;
a return electrode;
a microneedle array, including a PCB and a plurality of microneedle electrodes provided on the PCB;
a switch switching circuit, wherein an input terminal of the switch switching circuit is connected to the power supply, two first output terminals of the switch switching circuit are electrically connected to the microneedle array through a PCB, and a second output terminal of the switch switching circuit is electrically connected to the return electrode;
the radio frequency microneedle array control method includes:
controlling the switch switching circuit to communicate the power supply, the microneedle array and the return electrode in a unipolar mode, wherein electrical polarities of a plurality of microneedle electrodes in the microneedle array are identical; and controlling the switch switching circuit to communicate the power supply and the microneedle array in a bipolar mode, wherein the electrical polarity of at least one of the microneedle electrodes in the microneedle array is opposite to the electrical polarity of the remaining microneedle electrodes in the microneedle array.

In an embodiment, the radio frequency microneedle array control method further includes:

controlling the microneedle array to switch between the unipolar mode and the bipolar mode at least once; and controlling the switch switching circuit to switch the electrodes of each microneedle electrode of the microneedle array in a determination that the microneedle array is controlled to operate in the bipolar mode.

In an embodiment, the radio frequency microneedle array control method further includes:

obtaining an impedance value of a tissue between a positive electrode and a negative electrode of the microneedle and a preset impedance threshold; and controlling a radio frequency energy output of the power supply according to the obtained impedance value of the tissue between the positive electrode and the negative electrode of the microneedle and the preset impedance threshold.

In an embodiment, the obtaining the impedance value of the tissue between the positive electrode and the negative electrode of the microneedle and the preset impedance threshold includes:

obtaining a current impedance value of the tissue between the positive electrode and the negative electrode of the microneedle after the microneedle electrode is pierced into the skin, and reaches a preset depth; and calculating the preset impedance threshold according to the obtained current impedance value of the tissue between the positive electrode and the negative electrode of the microneedle.

In an embodiment, the controlling the radio frequency energy output of the power supply according to the obtained impedance value of the tissue between the positive electrode and the negative electrode of the microneedle and the preset impedance threshold includes:

controlling the power supply to reduce the radio frequency energy output in a determination that the obtained impedance value of the tissue between the positive electrode and the negative electrode of the microneedle continues to increase and is greater than the preset impedance threshold.

The present application further provides a radio frequency microneedle therapeutic apparatus, including the radio frequency microneedle array control device as described above.

The present application provides a radio frequency microneedle array control device, including: a power supply, a return electrode and a microneedle array. The main controller is configured to control the switch switching circuit to communicate the power supply, the microneedle array and the return electrode in the unipolar mode, and electrical polarities of the plurality of microneedle electrodes in the microneedle array are identical; and the main controller is configured to control the switch switching circuit to communicate the power supply and the microneedle array in the bipolar mode, and the electrical polarity of at least one of the microneedle electrodes in the microneedle array is opposite to the electrical polarity of the remaining microneedle electrodes in the microneedle array. The radio frequency microneedle array control device in the present application can realize the switching of single and double electrodes of the microneedle, such that the action area of the microneedle has better treatment effect in a width horizontal to the skin and a depth perpendicular to the skin, which is beneficial to improve the uniformity of energy output.

DESCRIPTION OF THE DRAWINGS

In order to more clearly illustrate the technical solutions in the embodiments of the present application or in the prior art, the following will briefly introduce the drawings that need to be configured in the description of the embodiments or the related art. Obviously, the drawings in the following description are only some embodiments of the present application. For those of ordinary skill in the art, under the premise of not paying creative labor, other drawings can also be obtained according to the structure shown in these drawings.

DETAILED DESCRIPTION OF THE EMBODIMENTS

The present application provides a radio frequency microneedle array control device.

Figure 1:
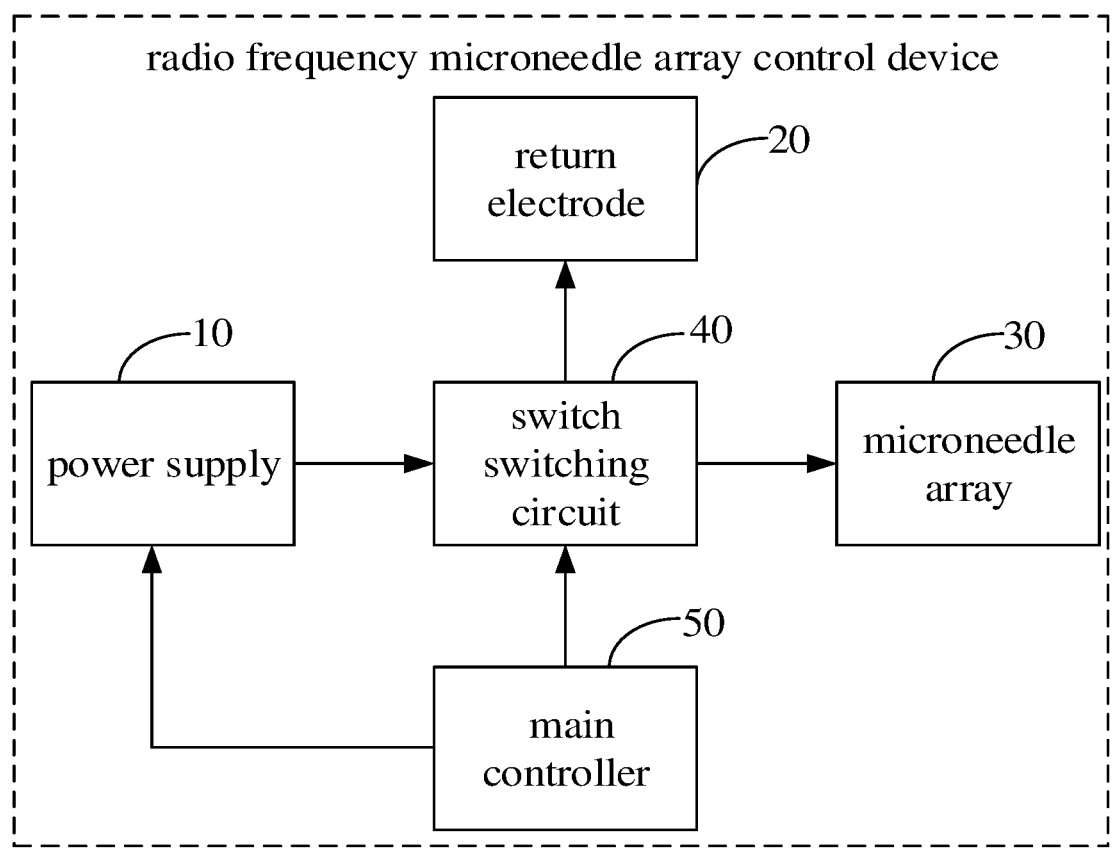
FIG. 1 is a schematic structural diagram of the circuit of a radio frequency microneedle array control device according to an embodiment of the present application.

As shown in FIG. 1, in an embodiment of the present application, the radio frequency microneedle array 30 control device includes:

a power supply 10;

a return electrode 20;

a microneedle array 30, including a printed circuit board (PCB) and a plurality of microneedle electrodes 420 provided on the PCB;

a switch switching circuit 40, an input terminal of the switch switching circuit 40 is connected to the power supply 10, two first output terminals of the switch switching circuit 40 are electrically connected to the microneedle array 30 through the PCB, and a second output terminal of the switch switching circuit 40 is electrically connected to the return electrode 20;

a main controller 50, the main controller 50 has a unipolar mode and a bipolar mode. The main controller 50 is configured to control the switch switching circuit 40 to communicate the power supply 10, the microneedle array 30 and the return electrode 20 in the unipolar mode, and electrical polarities of the plurality of microneedle electrodes 420 in the microneedle array 30 are identical.

The main controller 50 is configured to control the switch switching circuit 40 to communicate the power supply 10 and the microneedle array 30 in the bipolar mode, and the electrical polarity of at least one of the microneedle electrodes 420 in the microneedle array 30 is opposite to the electrical polarity of the remaining microneedle electrodes 420 in the microneedle array 30.

Figure 2:
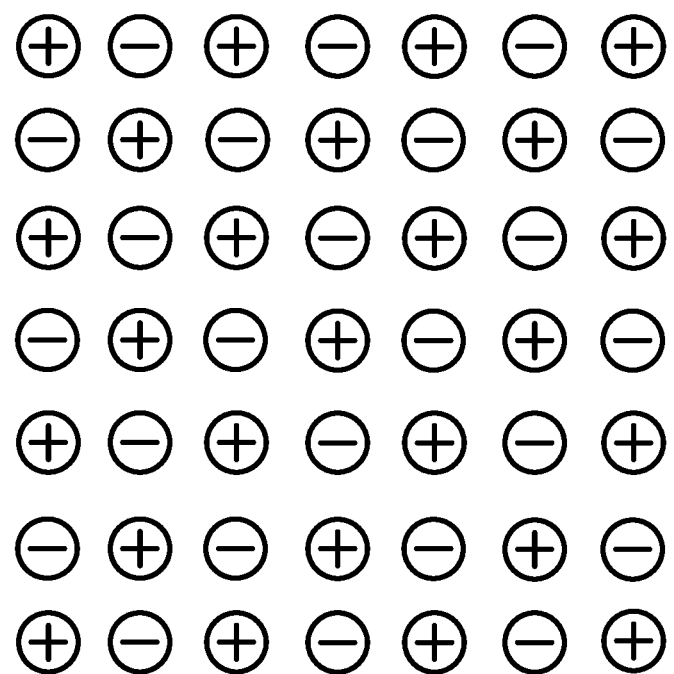
FIG. 2 is a diagram of the electrode arrangement of the microneedle array in FIG. 1.

In this embodiment, the microneedle electrode 420 can be made of any conductive metal or other conductive materials, such as stainless steel, gold, silver, platinum, platinum-iridium alloy, tungsten, or the like, and a surface material of the microneedle electrode 420 is a material with good biocompatibility, such as 304 stainless steel, 316 stainless steel, gold, platinum, platinum-iridium alloy, or the like. The entire microneedle array 30 has at least one microneedle polarity opposite to the other microneedles, i.e. the microneedle array 30 has both positive and negative electrodes. The microneedle electrode 420 on the microneedle array 30 can be set as a positive electrode or a negative electrode according to needs, and the electrodes of each microneedle can be switched, and alternately act as a positive electrode and a negative electrode in turn during different operation time periods. The microneedle electrode 420 is not fixed at the positions of the positive electrode and the negative electrode, which prevents the same microneedle electrode 420 from always acting as a positive electrode or always acting as a negative electrode during the application process. It can be realized according to voltages of different polarities applied to each microneedle. The polarities of the electrodes of each microneedle and the electrodes of adjacent microneedles can be the same or different. For example, the electrodes of the microneedle array 30 can be arranged in rows (columns), and the positive and the negative are staggered, that is, the electrode of the microneedle in a row (column) is set as the positive electrode, and the microneedle electrode 420 in the adjacent row (column) is the negative electrode. As shown in FIG. 2, the electrodes of each microneedle are opposite to the electrodes of its adjacent microneedles, that is, the microneedle electrode 420 in each row and the microneedle electrode 420 in each column are staggered. The PCB may be configured for mounting the microneedle array 30, may be a PCB, or may be a substrate for mounting the microneedle array 30. In an embodiment, the radio frequency microneedle array control device further includes a driving structure provided with a motor, the driving structure can drive the PCB to move, and further drive the microneedle array 30 to move, the microneedle array 30 can be inserted into the skin, and after reaching a specified depth, the microneedle tip starts to release radio frequency energy to perform radio frequency therapy.

An output frequency of the power supply 10 may be 0.3 MHz to 100 MHz, and the power supply 10 may be a continuous output power supply or a pulse output power supply or a continuous and pulse output power supply. The power supply 10 may be an external power supply or a rechargeable lithium battery, the power supply 10 may be provided with a power management chip and a rechargeable battery, and the output voltage of the power supply 10 may be controllable. For example, the main controller 50 may output different control signals to the power supply 10, so that the power supply 10 outputs a pulse voltage. The power supply 10 can be logically connected to the main controller 50 through the power management chip, so that the power management chip realizes the functions of managing charging, discharging, and power consumption management, as well as switching and selection of discharge modes, constant power discharge or pulse discharge.

Further, the number of power supply 10 may be one or multiple, and when multiple power supply units are provided, the multiple power supply units are respectively connected to the switch switching circuit.

The microneedle therapy generally achieves constant power output through impedance detection feedback. In this embodiment, an impedance detection circuit is further provided, the impedance detection circuit is connected to each microneedle electrode in the microneedle array, an output terminal of the impedance detection circuit is connected to the main controller, and the main controller 50 is further configured to control the power supply unit to provide a corresponding power supply voltage to the corresponding microneedle electrodes according to the positive and negative impedances of the microneedle electrodes detected by the impedance detection circuit.

The impedance detection circuit detects the impedance between the positive and negative microneedle electrodes 420, and the output terminal is electrically connected to the main controller 50. The main controller 50 may also control an operation of the independent radio frequency power supply or each power supply unit according to the feedback data of the impedance sensor to adjust a radio frequency output power of the microneedle electrode 420.

In the unipolar mode, when the power supply 10 is provided with an independent radio frequency power supply, the main controller 50 may control the independent radio frequency power supply according to the feedback data of the impedance sensor to adjust the radio frequency output power of the microneedle electrode 420 of the microneedle array, thereby ensuring a constant total output power.

When the power supply 10 is provided as multiple independent radio frequency power supplies, an independent radio frequency power supply can be provided for each microneedle electrode 420 (in bipolar mode, each microneedle electrode pair), and each microneedle electrode is provided with an impedance sensor to detect the impedance of each microneedle electrode 420 and adjust the output power according to the impedance, ensuring that the output power of each needle is the same, a group power supply mode is adopted. That is, each group of microneedle electrodes 420 is powered by an independent radio frequency power supply. The main controller 50 controls the corresponding power supply unit to adjust the output (adjust the frequency or pulse width or voltage amplitude) according to a feedback of the detected impedance. In this embodiment, multiple independent power supplies are configured for precise control to ensure uniform energy between treatment areas.

In the bipolar mode, the impedance between each group of positive and negative microneedle electrodes 420 of the microneedle array 30 can be detected, and the output power can be adjusted according to the impedance between each group of positive and negative microneedle electrodes 420. Specifically, the microneedle array 30 may be set to be a plurality of electrode pairs, and a voltage of each electrode pair may be adjustable. Correspondingly, the number of power supply 10 may be set to be multiple, and each electrode pair is correspondingly provided with the power supply 10; or, the power supply 10 is provided with a plurality of output terminals and a plurality of control switches (not shown in the figure), each of the output terminals and the control switches are connected to one of the electrode pairs; each of the control switches, when closed, supplies power to the corresponding electrode pair. The power supply 10 of this embodiment may be provided with a plurality of independent power supply units, and one power supply unit supplies power to one electrode pair. Alternatively, a power supply 10 is provided, the power supply 10 may be provided with a plurality of output terminals, one output terminal and one control switch correspond to one electrode pair. When it is necessary to supply power to a certain electrode pair, a conduction degree and conduction frequency of the corresponding control switch of the electrode pair may be controlled to adjust frequency or a pulse width or a voltage amplitude output to the microneedle electrode 420. In other embodiments, the microneedles can further be set to multiple electrode groups, each electrode group includes a same number of positive microneedle electrode 420 and negative microneedle electrode 420, the microneedles are grouped by the power supply 10, and each microneedle is alternately arranged, multiple microneedle electrode 420 can be arranged in a limited target plane at an appropriate density, and the spacing distance between adjacent microneedle electrode 420 is ensured to prevent proximity effect. In bipolar mode, multiple independent radio frequency power supplies can be used, which can accurately control the temperature of a thermal diffusion area of each group of microneedles and achieve better therapeutic effects.

The main controller 50 may be a microcontroller, a digital signal processor (DSP), a field-programmable gate array (FPGA) and other microprocessors. In some embodiments, the main controller can further be implemented by the radio frequency microneedle therapeutic apparatus special chip. There is no restriction here. A person skilled in the art can integrate some hardware circuits and software programs or algorithms in the main controller 50, use various interfaces and circuits to connect various parts of the entire radio frequency microneedle array 30 control device, run or execute software programs and/or modules in the main controller 50, and call the data in the main controller 50, perform various functions of the radio frequency microneedle array control device and process data, so as to monitor the radio frequency microneedle array control device as a whole. The main controller 50 stores a variety of working modes, which can be selected and switched according to the needs of the user. The operating modes include a unipolar mode and a bipolar mode. In bipolar mode, the operating mode can also include that the polarity switching period of each electrode and a length of time. A user can also choose a custom mode or a preset mode. The preset mode can set different working frequencies, voltage pulses, and electrode energization hours of microneedles according to statistics, research, or experience values, etc., and then form different options for users to choose. Custom settings are for users to set the working duration of microneedles and the working voltage of microneedles according to their own needs.

The main controller 50 may specifically control the switch switching circuit 40 to operate, so as to control the microneedle array 30 to switch between the unipolar mode and the bipolar mode. And during one treatment, the microneedle array 30 is controlled to switch between the unipolar mode and the bipolar mode at least once. Alternatively, the main controller 50 may further control the switch switching circuit 40 to operate, so as to control the microneedle array 30 to switch between the unipolar mode and the bipolar mode in a preset period. In a specific embodiment, the duration T of the first treatment in the treatment phase can be set to 10 ms to 12 s. In the two working modes of the unipolar mode and the bipolar mode, a duration T1 in each working mode can be in a range of 5 ms to 5 S.

The radio frequency microneedle array control device of the present application includes a power supply 10, a return electrode 20, and a microneedle array 30. The main controller 50 is configured to control the switch switching circuit 40 to communicate the power supply 10, the microneedle array 30 and the return electrode 20 in the unipolar mode, and electrical polarities of the plurality of microneedle electrodes 420 in the microneedle array 30 are identical; and the main controller 50 is configured to control the switch switching circuit 40 to communicate the power supply 10 and the microneedle array 30 in the bipolar mode, and the electrical polarity of at least one of the microneedle electrodes 420 in the microneedle array 30 is opposite to the electrical polarity of the remaining microneedle electrodes 420 in the microneedle array. The radio frequency microneedle array control device in the present application can realize the switching of single and double electrodes of the microneedle, such that the action area of the microneedle has better treatment effect in a width horizontal to the skin and a depth perpendicular to the skin, which is beneficial to improve the uniformity of energy output.

As shown in FIG. 1, in an embodiment, the main controller 50 switches the electrodes of each microneedle electrode 420 of the microneedle array 30 at least once when controlling the switch switching circuit 40 to operate.

The switch switching circuit 40 is configured to connect the positive and negative power supplies of the power supply 10 to the microneedle electrode 420 based on a control of the main controller 50, so that the microneedle electrode 420 operates as a positive electrode or a negative electrode. In the unipolar mode, each electrode in the microneedle array 30 has the same polarity, for example, all electrodes are positive. In this case, the power supply 10 is under the control of the switch switching circuit 40, and each electrode of the microneedle array 30 is provided with the positive power supply, and the negative electrode of the power supply 10 is connected to the return electrode 20 under the control of the switch switching circuit 40. When the return electrode 20 is attached to a surface of the human body when working, the return electrode 20, the power supply 10, the microneedle electrodes 420 of the microneedle array 30, the switch switching circuit 40, and the human body form a conducting loop (the return electrode 20 is generally attached to the back of the neck when treating the face, and is generally attached to the back when treating the abdomen).

In the bipolar mode, the switch switching circuit 40 introduces the power supply 10 into the microneedle array 30, and under the control of the switch switching circuit 40, the positive electrode and the negative electrode of the power supply 10 are respectively connected to the respective microneedle electrodes 420, the microneedle array 30 has at least one negative microneedle electrode 420, and the remaining microneedle electrodes 420 may be completely or partially provided as positive microneedle electrodes 420. Alternatively, there is at least one positive microneedle electrode 420, and the remaining microneedle electrode 420 may be wholly or partially disposed as negative microneedle electrode 420. The main controller 50 controls the switch switching circuit 40 to switch the electrodes of the microneedle electrodes 420 of the microneedle array 30, that is, the polarities of the microneedle electrodes 420 can be switched. For example, after the microneedle array 30 continues to work for a period of time T', all microneedles of the microneedle array 30 are switched over to the power supply (two ports A and B of the power supply 10, the microneedle connected to the port A is switched to the port B, and the microneedle connected to the port B is switched to the port A at the same time), and the power supply is switched at least once in each bipolar mode. In bipolar mode, the microneedles connected at both ends of the radio frequency power supply will have different thermal dispersion regions, which are mainly caused by the characteristics of the power supply, which will lead to uneven thermal dispersion regions and affect the treatment effect. The above effects can be eliminated by switching the power supply terminal.

The switch switching circuit 40 can further control the microneedle array 30 to switch between the unipolar mode and the bipolar mode. Specifically, during the treatment, the initial working mode can be the unipolar mode or the bipolar mode. After a period of time T1, the working mode is switched, that is, from the unipolar mode to the bipolar mode, or from the bipolar mode to the unipolar mode, and the working mode is switched at least once in the entire treatment phase. The action areas (thermal dispersion zone) of the two modes are different. A depth of the action area of the unipolar mode is deeper than that of the bipolar mode. The action area of the bipolar mode is mainly between the two needles with opposite polarity, and the horizontal direction ratio is wider. In order to expand the action area and improve the treatment effect, the present embodiment adopts the mode of unipolar and bipolar switching, so that the width of the action area in the horizontal direction and the depth in the vertical skin direction achieve a desired effect.

The present application further provides a radio frequency microneedle array control method, which is applied to the microneedle electrode array device as described above, and the radio frequency microneedle array control device includes:

a power supply;
a return electrode;
a microneedle array including a PCB and a plurality of microneedle electrodes provided on the PCB;
a switch switching circuit, an input terminal of the switch switching circuit is connected to the power supply, two first output terminals of the switch switching circuit are electrically connected to the microneedle array through a PCB, and a second output terminal of the switch switching circuit is electrically connected to the return electrode.

Figure 3:
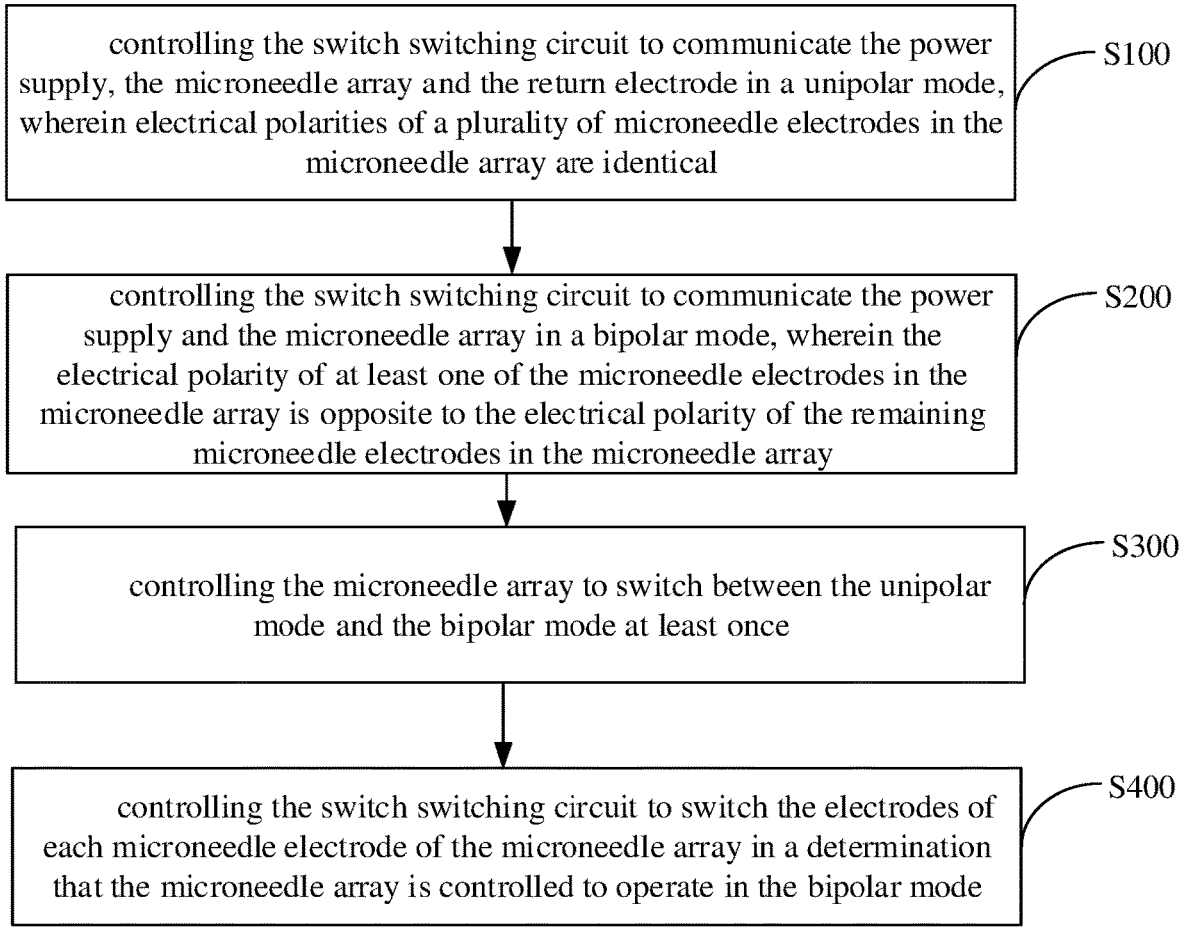
FIG. 3 is a flowchart of a radio frequency microneedle array control method according to an embodiment of the present application.

As shown in FIG. 3, the radio frequency microneedle array control method includes:

Operation S100, controlling the switch switching circuit to communicate the power supply, the microneedle array and the return electrode in a unipolar mode, wherein electrical polarities of a plurality of microneedle electrodes in the microneedle array are identical; and Operation S200, controlling the switch switching circuit to communicate the power supply and the microneedle array in a bipolar mode, wherein the electrical polarity of at least one of the microneedle electrodes in the microneedle array is opposite to the electrical polarity of the remaining microneedle electrodes in the microneedle array. In this embodiment, the switch switching circuit is based on a control of the main controller, and is configured to connect the positive and negative power sources of the power supply to the microneedle electrode, so that the microneedle electrode works as a positive electrode or a negative electrode. In the unipolar mode, each electrode in the microneedle array has the same polarity, for example, all electrodes are positive. In this case, the power supply is under the control of the switch switching circuit, and each electrode of the microneedle array is provided with the positive power supply, and the negative electrode of the power supply is connected to the return electrode under the control of the switch switching circuit. When the return electrode is attached to a surface of the human body when working, the return electrode, the power supply, the microneedle electrodes of the microneedle array, the switch switching circuit, and the human body form a conducting loop (the return electrode is generally attached to the back of the neck when treating the face, and is generally attached to the back when treating the abdomen).

In the bipolar mode, the switch switching circuit introduces the power supply into the microneedle array, and under the control of the switch switching circuit, the positive electrode and the negative electrode of the power supply are respectively connected to the respective microneedle electrodes, the microneedle array has at least one negative microneedle electrode, and the remaining microneedle electrodes may be completely or partially provided as positive microneedle electrodes. Alternatively, there is at least one positive microneedle electrode, and the remaining microneedle electrode may be wholly or partially disposed as negative microneedle electrode. The main controller controls the switch switching circuit to switch the electrodes of the microneedle electrodes of the microneedle array, that is, the polarities of the microneedle electrodes can be switched. For example, after the microneedle array continues to work for a period of time T', all microneedles of the microneedle array are switched over to the power supply (two ports A and B of the power supply, the microneedle connected to the port is switched to the port B, and the microneedle connected to the port B is switched to the port A at the same time), and the power supply is switched at least once in each bipolar mode. In bipolar mode, the microneedles connected at both ends of the radio frequency power supply will have different thermal dispersion regions, which are mainly caused by the characteristics of the power supply, which will lead to uneven thermal dispersion regions and affect the treatment effect. The above effects can be eliminated by switching the power supply terminal.

In an embodiment, the radio frequency microneedle array control method further includes:

Operation S300, controlling the microneedle array to switch between the unipolar mode and the bipolar mode at least once;

Operation S400, controlling the switch switching circuit to switch the electrodes of each microneedle electrode of the microneedle array in a determination that the microneedle array is controlled to operate in the bipolar mode.

The switch switching circuit can further control the microneedle array to switch between the unipolar mode and the bipolar mode. Specifically, during the treatment, the initial working mode can be the unipolar mode or the bipolar mode. After a period of time T1, the working mode is switched, that is, from the unipolar mode to the bipolar mode, or from the bipolar mode to the unipolar mode, and the working mode is switched at least once in the entire treatment phase. The action areas (thermal dispersion zone) of the two modes are different. A depth of the action area of the unipolar mode is deeper than that of the bipolar mode. The action area of the bipolar mode is mainly between the two needles with opposite polarity, and the horizontal direction ratio is wider. In order to expand the action area and improve the treatment effect, the present embodiment adopts the mode of unipolar and bipolar switching, so that the width of the action area in the horizontal direction and the depth in the vertical skin direction achieve a desired effect.

In an embodiment, the radio frequency microneedle array control method further includes:

S500, obtaining an impedance value of a tissue between a positive electrode and a negative electrode of the microneedle and a preset impedance threshold.

In this embodiment, an impedance sensor may be disposed on the microneedle electrodes to detect the impedance between the positive electrode and the negative electrode of the microneedle. For example, in the bipolar mode, one impedance sensor may be disposed on each microneedle electrode pair to detect the impedance between the microneedle electrodes. The preset impedance threshold can be obtained by the following steps:

obtaining the current impedance value of the tissue between the positive electrode and the negative electrode of the microneedle after the microneedle electrode is pierced into the skin, and reaches the preset depth;

calculating the preset impedance threshold according to the obtained current impedance value of the tissue between the positive electrode and the negative electrode of the microneedle.

The radio frequency microneedle array control device further includes a driving structure provided with a motor, the driving structure can drive the PCB to move, and further drive the microneedle array to move, the microneedle array can be pierced into the skin, and after reaching a specified depth, the microneedle tip starts to release radio frequency energy to perform radio frequency therapy.

According to different working modes of the radio frequency microneedle array control device, the initial impedance values when the microneedle is inserted are also different. In an initial stage of microneedle treatment, the microneedle electrode is controlled to be inserted into the skin, and after reaching the preset depth, the initial impedance values in unipolar mode and bipolar mode can be obtained through impedance sensor and mode switching respectively. For example, in unipolar mode, the initial impedance value is Z1, and in bipolar mode, the initial impedance value is Z2. According to the obtained initial impedance value, a preset impedance threshold is set: in unipolar mode, the impedance threshold is k1×Z1+A, and in the bipolar mode, the impedance threshold is k2×Z2+B, and k1, k2, A, and B are constants preset according to experimental data.

Operation S600, controlling a radio frequency energy output of the power supply according to the obtained impedance value of the tissue between the positive electrodes and the negative electrodes of the microneedle and the preset impedance threshold.

controlling the power supply to reduce the radio frequency energy output in a determination that the obtained impedance value of the tissue between the positive electrode and the negative electrode of the microneedle continues to increase and is greater than the preset impedance threshold.

In this embodiment, when the radio frequency microneedle array control device is powered on, after the microneedle electrode is inserted into skin and reaches the preset depth, and after the initial impedance value at the time of microneedle insertion is obtained, the power output parameter can be determined according to the obtained initial impedance value, and the radio frequency energy is started to be output. The corresponding relationship between the power output and the impedance value is set in advance in the system. After reaching a certain temperature, the impedance will increase sharply. At this time, the impedance sensor can be configured to obtain the impedance value of the tissue between the positive electrode and the negative electrode of the microneedle during the treatment. When the impedance is detected to gradually increase and reaches the preset impedance threshold, the radio frequency energy output is reduced, on the contrary, the current radio frequency energy output is maintained. In this way, the independent radio frequency power supply can be controlled according to the feedback data of the impedance sensor to adjust the radio frequency output power of the microneedle array integral microneedle electrode, thus ensuring safety and therapeutic effect.

The present application further provides a radio frequency microneedle therapeutic apparatus, including the radio frequency microneedle array control device as described above. The detailed structure of the radio frequency microneedle array control device may refer to the above embodiments, and details are not described here. It can be understood that since the above-mentioned radio frequency microneedle array control device is configured in the radio frequency microneedle therapeutic apparatus of the present application, the embodiment of the radio frequency microneedle therapeutic apparatus of the present application includes all the technical solutions of all the embodiments of the radio frequency microneedle array control apparatus, and the technical effects achieved are exactly the same, and details are not described here.

The radio frequency microneedle therapeutic apparatus includes:

a shell 100, one end of the shell 100 is provided with an opening 110;

a driving mechanism 200 installed in the shell 100;

a cooling guide assembly 300 installed in the shell 100, and connected to the driving mechanism 200; and a microneedle assembly 400, the microneedle assembly 400 is connected to a side of the cooling guide assembly 300 facing the opening 110, the cooling guide assembly 300 is configured for cooling and cooling the microneedle assembly 400, and the driving mechanism 200 is configured for driving the cooling guide assembly 300 to move, so as to drive the microneedle assembly 400 to extend out of the shell 100 or move back into the shell 100 through the opening 110.

Specifically, the microneedle assembly 400 includes a PCB and a microneedle array. The microneedle array is provided with a plurality of microneedles. Each microneedle electrode 420 is electrically connected to the PCB 410. Alternatively, the microneedle array can further be welded to the PCB, and each microneedle electrode 420 can be configured to generate radio frequency current (a kind of high-frequency ΔC changing electromagnetic wave) to make radio frequency energy act on human tissues. In the related technology, because in the treatment process, the radio frequency current will continue to pass through the microneedles, so that the microneedles will heat up, and the warming microneedles will cause adhesion to the human tissue, so that it will cause unnecessary damage to the human tissue and affect the subsequent treatment effect.

The driving mechanism 200 is connected to the cooling guide assembly 300 to move, thereby driving the microneedle assembly 400 to extend out of the shell 100 or to move back into the shell 100 through the opening 110. When the microneedle assembly 400 extends out of the shell 100, the microneedle array can be inserted into the skin and release radio frequency energy after reaching a specified depth for radio frequency therapy. At the same time, in the process of radio frequency treatment, the cooling guide assembly 300 can cool the microneedle assembly 400 connected to the cooling guide assembly 300, effectively avoiding the adhesion between human tissue and microneedle electrode 420 due to the heating of the microneedle electrode 420, avoiding unnecessary damage to human tissue, thus reducing the pain of patients and improving the therapeutic effect and safety.

Figure 4:
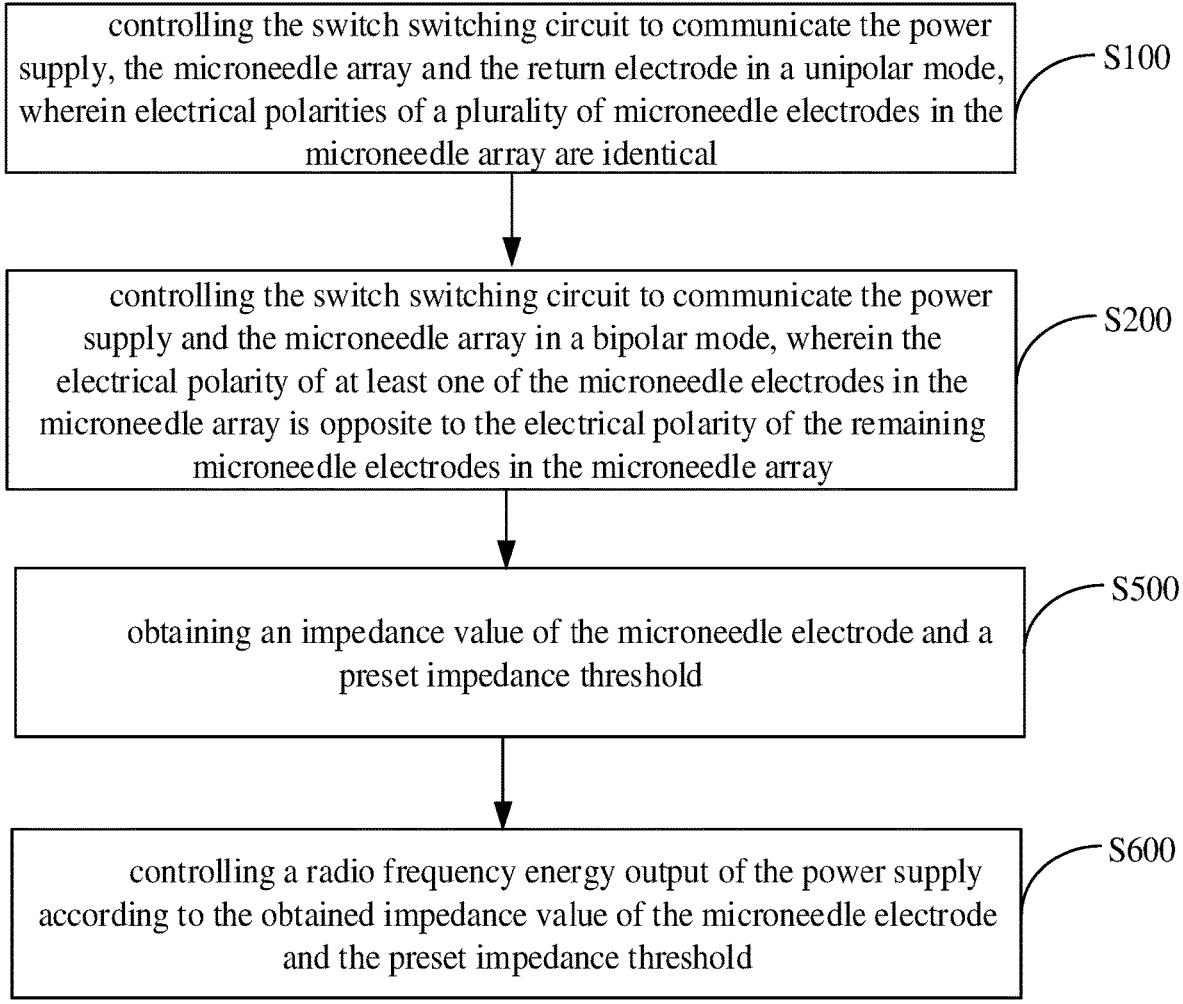
FIG. 4 is a flowchart of a radio frequency microneedle array control method according to an embodiment of the present application.
Figure 5:
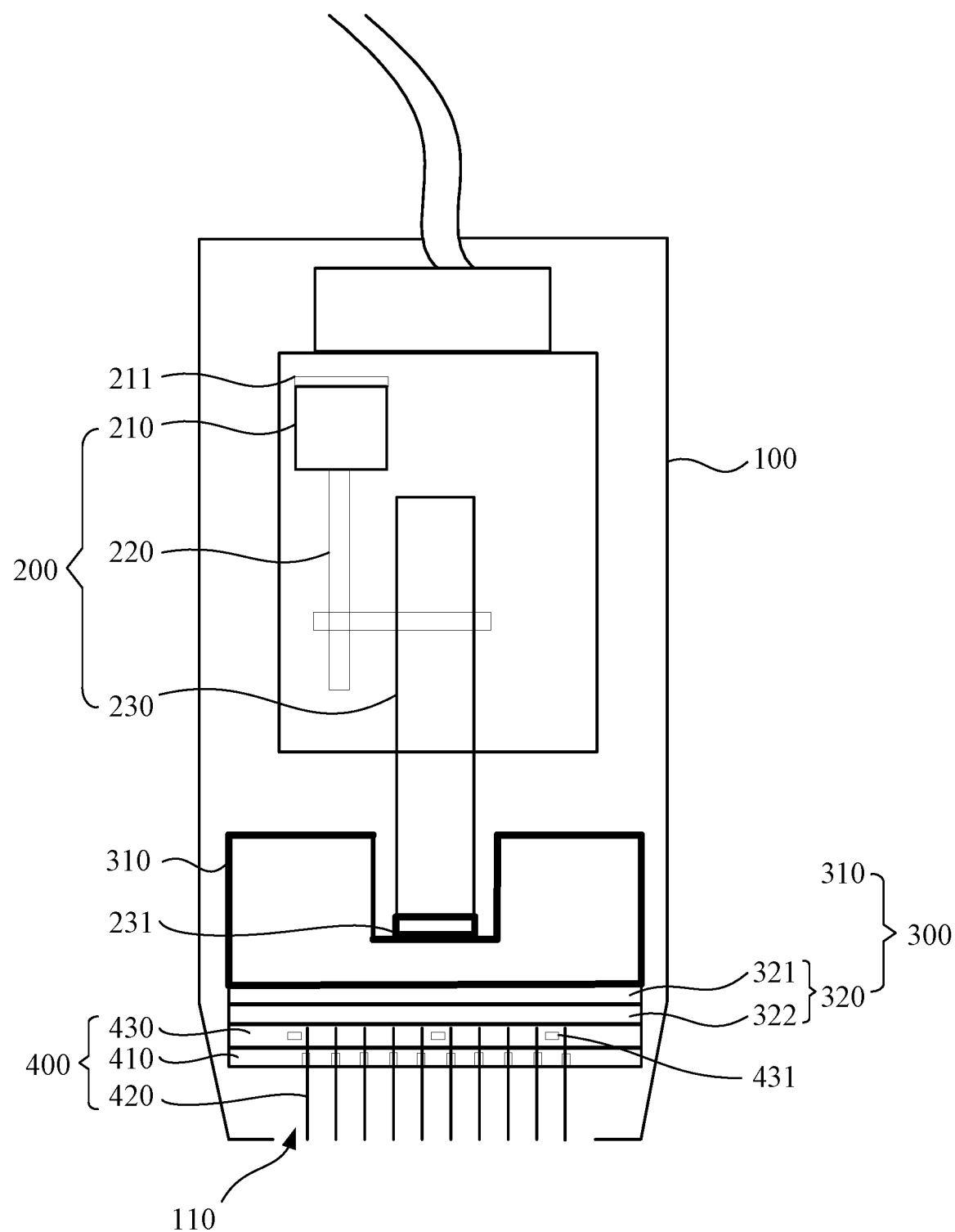
FIG. 5 is a schematic structural diagram of a radio frequency microneedle therapeutic apparatus according to an embodiment of the present application.

Further, as shown in FIG. 4, the cooling guide assembly 300 includes a heat dissipation device 310 and a refrigeration device 320, the driving mechanism 200 is drivingly connected to the heat dissipation device 310, the refrigeration device 320 is connected to the heat dissipation device 310, and the microneedle assembly 400 is connected to the refrigeration device 320. It can be understood that the refrigeration device 320 is configured for cooling and exchanging heat with the microneedle assembly 400, so as to achieve the purpose of cooling the microneedle assembly 400. In addition, according to the law of conservation of energy, the refrigeration device 320 will also emit heat while cooling. Therefore, in this embodiment, the cooling device 310 is provided in the shell 100 to dissipate heat from the refrigeration device 320. In other embodiments, the heat dissipation device 310 may not be provided in the shell 100, and the refrigeration device 320 naturally dissipate heat by contacting with air.

In this embodiment, the heat dissipation device 310 includes a heat-conducting shell and a cooling liquid, the heat-conducting shell encloses a liquid storage chamber, and the cooling liquid is accommodated in the liquid storage chamber. Optionally, the heat conducting shell may be made of a metal material with good heat conduction such as compressed aluminum, and the cooling liquid may be brine or other liquids. It can be understood that the heat dissipation device 310 is essentially an energy storage device for temporarily storing heat transferred from the refrigeration device 320, while the heat in the energy storage device is slowly dissipated into the air. In other embodiments, the heat dissipation device 310 can also be fan and/or heat dissipation device to dissipate heat, but this heat dissipation method will produce a large noise.

In this embodiment, as shown in FIG. 4, the refrigeration device 320 is a semiconductor refrigerator, the semiconductor refrigerator includes a hot end 321 and a cold end 322 arranged in a stack, the hot end 321 is connected to the heat dissipation device 310, and the microneedle assembly 400 is connected to the cold end 322. A semiconductor refrigerator refers to a device that provides the thermal-electrical effect of a semiconductor to produce cold energy. Specifically, two different metals are connected to a conductor, and the direct current is connected, the temperature at one contact decreases, and the contact is a cold end 322; the temperature at the other contact increases, which is called as a hot end 321. In the technical solution of this embodiment, by connecting the microneedle assembly 400 to the cold end 322 of the semiconductor refrigerator, the heat by the microneedle electrode 420 in the microneedle assembly 400 can be conducted to the cold end 322, thereby reducing the temperature of the microneedle electrode 420. In other embodiments, other refrigeration devices 320, such as heat exchangers, may also be configured. However, as a refrigeration device 320, the semiconductor refrigerator has advantages of simple structure, small volume and fast refrigeration, which is beneficial to reduce the overall volume of the radio frequency microneedle therapeutic apparatus.

According to the previous description, the microneedle assembly 400 includes a PCB 410 and a microneedle array electrically connected to the PCB, and the microneedle array is installed on the PCB 410. It is worth noting that the microneedle array should correspond to an opening 110 so as to extend out of the shell 100 or back into the shell 100 through the opening. In addition, the microneedle assembly 400 further includes an insulating layer 430, and the insulating layer 430 is provided between the cold end 322 and the PCB 410. Specifically, the microneedle array runs through the PCB 410 and is connected to the insulating layer 430. It can be understood that the insulating layer 430 can conduct the heat of the microneedle array to the cold end 322, while avoiding conductive contact between the microneedle array and the cold end 322. The insulating layer can be realized by using materials with higher thermal conductivity, such as ceramics.

Further, as shown in FIG. 1, a temperature sensor 431 is further installed in the insulating layer 430, and the temperature sensor 431 is electrically connected to the central control unit of the radio frequency microneedle therapeutic apparatus. The central control unit may be a main controller in the radio frequency microneedle array control device, or a central processing unit (CPU) in the radio frequency microneedle treatment apparatus, and the main controller in the radio frequency microneedle array control device may further be a CPU in the radio frequency microneedle treatment apparatus.

It can be understood that the temperature sensor 431 is configured to detect the temperature of the microneedle electrode 420, and the detected temperature is converted into an electrical signal and fed back to the central control unit of the radio frequency microneedle therapeutic apparatus, so that the central control unit can monitor the temperature of the microneedle electrode 420 in real time. Specifically, firstly, the temperature value of the microneedle electrode 420 is obtained through the temperature sensor 431, and the central control unit determines whether the temperature of the microneedle electrode 420 exceeds the preset primary temperature threshold or the final warning threshold. If the temperature exceeds the primary temperature threshold, the central control unit will control the refrigeration device 320 to refrigerate or increase the power of the refrigeration device 320. If the temperature exceeds the final warning threshold, the central control unit will control a driving member 210 to stop running, and stop radio frequency energy output.

Further, as shown in FIG. 4, the driving mechanism 200 includes a driving member 210, a transmission member 220, and a driving rod 230. The driving member 210 and the driving rod 230 are drivingly connected through the transmission member 220, and the cold guide assembly 300 and the driving rod 230 are connected. It can be understood that the driving member 210 drives the driving rod 230 to move through the transmission member 220, thereby driving the cooling guide assembly 300 to move, and the microneedle assembly 400 connected to the cooling guide assembly 300 also moves accordingly.

In this embodiment, the drive rod 230 is provided with a pressure sensor 231 toward the end of the cooling guide assembly 300, and the pressure sensor 231 is electrically connected to the central control unit. It can be understood that the speed at which the microneedle array is inserted into the skin directly affects the pain of the human body. Different people and different parts of the skin need different acting forces. The central control unit can adjust the power of the driving member by receiving the pressure feedback 231 by the pressure sensor to ensure that the microneedle array can be quickly inserted into human tissues and improve the experience effect.

In this embodiment, the driving member 210 is a motor, and the motor is equipped with an encoder 211. It can be understood that the encoder 211 can feed back the accurate motor stroke, and then feed back the depth of the microneedle electrode 420 actually inserted into the human body tissue. The central control unit can obtain the correction value of the insertion depth through PID algorithm according to the difference between an insertion depth value h1 set by the user and a feedback value h2 by the encoder 211 and feed it back to the motor, so as to ensure accuracy of the depth of the microneedle electrode 420 inserted into the human body tissue.

Optionally, the end face of the shell 100 in contact with the skin may also be provided with a fitting sensor to detect whether the radio frequency microneedle therapeutic apparatus fits with the skin during treatment, which is beneficial to guide the user to operate the therapeutic apparatus correctly, to prevent the microneedle electrode 420 from releasing radio frequency energy on the skin surface and causing skin burns, and to further improve the safety of the treatment process.

The above is only a preferred embodiment of the present application, and does not limit the patent scope of the present application. Any equivalent structural transformation made under the application concept of the present application by using the description and drawings of the present application, or direct/indirect application in other related technical fields, is included in the patent protection scope of the present application.

What is claimed is:

1. A radio frequency microneedle array control device, comprising:
    a power supply;
    a return electrode;
    a microneedle array, comprising a printed circuit board (PCB) and a plurality of microneedle electrodes provided on the PCB;
    a switch switching circuit, wherein an input terminal of the switch switching circuit is connected to the power supply, two first output terminals of the switch switching circuit are electrically connected to the microneedle array through the PCB, and a second output terminal of the switch switching circuit is electrically connected to the return electrode; and
    a main controller having a unipolar mode and a bipolar mode,
    wherein:
    the main controller is configured to control the switch switching circuit to communicate the power supply, the microneedle array and the return electrode in the unipolar mode, and electrical polarities of the plurality of microneedle electrodes in the microneedle array are identical,
    the main controller is configured to control the switch switching circuit to communicate the power supply and the microneedle array in the bipolar mode, and the electrical polarity of at least one of the microneedle electrodes in the microneedle array is opposite to the electrical polarity of the remaining microneedle electrodes in the microneedle array, and
    the main controller is configured to control the switch switching circuit to operate to control the microneedle electrodes in the microneedle array to switch between the unipolar mode and the bipolar mode.

2. A radio frequency microneedle therapeutic apparatus, comprising the radio frequency microneedle array control device of claim 1.

3. The radio frequency microneedle array control device of claim 1, wherein the main controller is configured to control the microneedle array to switch between the unipolar mode and the bipolar mode at least once while controlling the switch switching circuit to operate.

4. The radio frequency microneedle array control device of claim 1, wherein the main controller is configured to control the switch switching circuit to operate to control the microneedle array to switch between the unipolar mode and the bipolar mode in a preset cycle.

5. The radio frequency microneedle array control device of claim 1, wherein the main controller is configured to control the switch switching circuit to switch the electrical polarity of each microneedle electrode of the microneedle array in the bipolar mode.

6. The radio frequency microneedle array control device of claim 5, wherein the main controller switches the electrical polarity of each microneedle electrode of the microneedle array at least once while controlling the switch switching circuit to operate.

7. The radio frequency microneedle array control device of claim 1, wherein the power supply comprises:
    a radio frequency power supply or a plurality of mutually independent radio frequency power supplies connected to the switch switching circuit.

8. A radio frequency microneedle array control method, applied to a radio frequency microneedle array control device, wherein the radio frequency microneedle array control device comprises:
    a power supply;
    a return electrode;
    a microneedle array, comprising a PCB and a plurality of microneedle electrodes provided on the PCB;
    a switch switching circuit, wherein an input terminal of the switch switching circuit is connected to the power supply, two first output terminals of the switch switching circuit are electrically connected to the microneedle array through a PCB, and a second output terminal of the switch switching circuit is electrically connected to the return electrode;
    wherein the radio frequency microneedle array control method comprises:
    controlling the switch switching circuit to communicate the power supply, the microneedle array and the return electrode in a unipolar mode, wherein electrical polarities of a plurality of microneedle electrodes in the microneedle array are identical;
    controlling the switch switching circuit to communicate the power supply and the microneedle array in a bipolar mode, wherein the electrical polarity of at least one of the microneedle electrodes in the microneedle array is opposite to the electrical polarity of the remaining microneedle electrodes in the microneedle array; and
    controlling the switch switching circuit to operate to control the microneedle electrodes in the microneedle array to switch between the unipolar mode and the bipolar mode.

9. The radio frequency microneedle array control method of claim 8, further comprising:
    controlling the microneedle array to switch between the unipolar mode and the bipolar mode at least once; and
    controlling the switch switching circuit to switch the electrodes of each microneedle electrode of the microneedle array in a determination that the microneedle array is controlled to operate in the bipolar mode.

10. The radio frequency microneedle array control method of claim 8, further comprising:

obtaining an impedance value of a tissue between a positive electrode and a negative electrode of the microneedle and a preset impedance threshold; and controlling a radio frequency energy output of the power supply according to the obtained impedance value of the tissue between the positive electrode and the negative electrode of the microneedle and the preset impedance threshold.

11. The radio frequency microneedle array control method of claim 10, wherein the obtaining the impedance value of the tissue between the positive electrode and the negative electrode of the microneedle and the preset impedance threshold comprises:

obtaining a current impedance value of the tissue between the positive electrode and the negative electrode of the microneedle after the microneedle electrode is pierced into the skin, and reaches a preset depth; and calculating the preset impedance threshold according to the obtained current impedance value of the tissue between the positive electrode and the negative electrode of the microneedle.

12. The radio frequency microneedle array control method of claim 10, wherein the controlling the radio frequency energy output of the power supply according to the obtained impedance value of the tissue between the positive electrode and the negative electrode of the microneedle and the preset impedance threshold comprises:

controlling the power supply to reduce the radio frequency energy output in a determination that the obtained impedance value of the tissue between the positive electrode and the negative electrode of the microneedle continues to increase and is greater than the preset impedance threshold.

* * * * *